(12) United States Patent
Ohnishi et al.

(10) Patent No.: US 9,684,062 B2
(45) Date of Patent: Jun. 20, 2017

(54) RADAR ANTENNA DEVICE AND METHOD FOR CONTROLLING ELECTRIC POWER SOURCE THEREOF

(71) Applicant: FURUNO Electric Company Limited, Nishinomiya, Hyogo (JP)

(72) Inventors: Yoshifumi Ohnishi, Nishinomiya (JP); Suminori Ekuni, Nishinomiya (JP); Motoji Kondo, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 382 days.

(21) Appl. No.: 14/513,946

(22) Filed: Oct. 14, 2014

(65) Prior Publication Data

US 2015/0102958 A1    Apr. 16, 2015

(30) Foreign Application Priority Data

Oct. 16, 2013 (JP) .................... 2013-215561

(51) Int. Cl.
  *G01S 13/02*      (2006.01)
  *G01S 7/02*       (2006.01)
  *H01Q 3/08*       (2006.01)

(52) U.S. Cl.
  CPC .............. *G01S 7/02* (2013.01); *G01S 13/02* (2013.01); *H01Q 3/08* (2013.01)

(58) Field of Classification Search
  CPC .............. G01S 13/02; G01S 7/02; H01Q 3/08
  USPC .................................... 342/175, 385
  See application file for complete search history.

(56) References Cited

U.S. PATENT DOCUMENTS 4,109,191 A * 8/1978 Callaghan ............ G05D 3/1481
                                              318/436

FOREIGN PATENT DOCUMENTS

JP    2000-139090 A    5/2000
JP    2005-098950 A    4/2005

* cited by examiner

*Primary Examiner* — Timothy A Brainard
(74) *Attorney, Agent, or Firm* — Global IP Counselors, LLP

(57) ABSTRACT

A radar antenna device is provided for rotating an antenna unit which successively emits transmission signals. It is configured to reduce the capacity of an electric power source for supplying electric power to a transmission circuit, a drive unit and the like. A radar antenna device is comprised with an antenna unit and a control unit. The antenna unit is driven by a drive unit to rotate and emits successively transmission signals generated by a transmission circuit into an outer space. After electric power is supplied to the drive unit to be driven, the control unit controls the transmission circuit in response to the transmission start signal from the transmission start signal producer so that the electric power for the transmission will be supplied to the transmission circuit.

14 Claims, 6 Drawing Sheets

Before Radar Antenna Start
Rotation Angle 0°

After Radar Antenna Start
Peak Motor Current
Rotation Angles 30~60°

After Radar Antenna Start
Electric Power Supply Start For
Signal Transmission
Rotation Angle 90°

RADAR ANTENNA DEVICE AND METHOD FOR CONTROLLING ELECTRIC POWER SOURCE THEREOF

CROSS-REFERENCE TO RELATED APPLICATIONS

This application claims priority to Japanese Patent Application No. 2013-215561 filed on Oct. 16, 2013. The entire disclosure of Japanese Patent Application No. 2013-215561 is hereby incorporated herein by reference.

BACKGROUND

Field of the Invention

The present invention relates to a radar antenna device and particularly to the arrangement for controlling electric power supply thereto when the device is started to operate.

Background Information

A conventional radar antenna is comprised with a rotating antenna for successively emitting and receiving radio waves, a transmission circuit for generating transmission signals emitted as radio waves into an outer space, and a motor for rotating the antenna. The rotational movement of the radar antenna is affected by winds blowing in a surrounding environment. If a radar antenna is installed in a moving body, it is also affected by wind pressures due to movements of the moving body. There have been known radar antennas to control the motor in coping with these wind affects. Radar antennas of this kind have been disclosed in Japanese unexamined patent application publications 2000-139090 and 2005-98950.

The radar antennas disclosed in these Japanese patent application publications are comprised with detection units for detecting rotational speeds of antenna units, and control motors in response to the rotational speed thereof. The control will prevent large rotational speed fluctuations to stabilize the rotational speed of the antenna units.

A radar antenna is coupled to an electric power source and is supplied with electric power therefrom. The electric power supplied is used for computations, emissions of transmission signals, and motor drives to rotate an antenna. Such electric power sources are required to have a capacity to supply electric power as much as the total maximum amount of the electric power required for the respective uses in order to avoid without failures electric power shortages.

In particular, high electric power has been required for emitting transmission signals and driving the motor when the antenna unit is started to be driven. Thus, a big capacity of the electric power source has been required. But, such electric power sources having the big capacity have been large in size and high in manufacturing cost, which should be improved.

SUMMARY

Accordingly, it is an object of the present invention to provide a radar antenna device for rotating an antenna unit emitting successively transmission signals which is configured to reduce the capacity of an electric power source for supplying electric power to a transmission circuit, a motor and the like thereof.

In accomplishing this and other objects of the present invention, there is provided a radar antenna device having an electric power source controlled by a novel method.

Another object of the present invention is to provide a radar antenna device which comprises an electric power source, a drive unit to produce a driving force when electric power is supplied from the electric power source, a transmission circuit to generate a transmission signal when electric power is supplied from the electric power source, an antenna rotated by the driving force produced by the drive unit and emits the transmission signal into an outer space, a transmission start signal producer configured to produce a transmission start signal, and a controller configured to control the transmission circuit in response to the transmission start signal from the transmission start signal producer so that the electric power for the transmission will be supplied to the transmission circuit after the electric power is supplied to the drive unit.

This configuration enables the capacity of the electric power source to be reduced, since electric power for emitting transmission signals is not used in an initial time to drive the antenna in which the maximum electric power is necessary to be supplied. Thus, it will be possible to manufacture the radar antenna device at a lower cost and to reduce the size and weight thereof.

One feature of the present invention is to provide a radar antenna device having the transmission start signal producer which comprises a detector detecting a state value varying when the antenna is rotated from the standstill and produces the transmission start signal when a detected state value meets the predetermined condition.

The arrangement enables to start supplying electric power for the transmission to the transmission circuit at an appropriate and predetermined timing, when an appropriate condition is set for the state value.

Another feature of the present invention is to provide a radar antenna device having the detector detecting as the state value a rotation angle resulted from a rotational movement of the antenna started from the standstill.

The arrangement enables to start supplying electric power for the signal transmission at an appropriate timing, since the degree of the mutual relationship is high between electric power necessary in starting to drive the antenna and the rotation angle of the antenna.

Another feature of the present invention is to provide the radar antenna device having the controller which judges that the predetermined condition is met when the rotation angle exceeds the threshold which is larger than a rotation angle corresponding to the peak current of the drive unit in a rotational movement of the antenna unit starting to rotate from the standstill.

With the arrangement, an appropriate threshold can be set, since the threshold is determined in considering the peak electric power for driving the motor.

Another feature of the present invention is to provide the radar antenna device setting the rotation angle threshold is within the one from 60 to 90 degrees.

With the arrangement, electric power for the signal transmission can be initiated to be supplied at a time instant after the peak value of the electric power for the drive is completely reached.

Another feature of the present invention is to provide the radar antenna device having the detector which detects an electric current flowing the drive unit as the state value.

The arrangement will enable to supply the electric power for the signal transmission after the peak value of the electric power for the drive is completely reached, since there is detected the current having a direct relationship with the electric power for the drive.

Another feature of the present invention is to provide the radar antenna device having the controller which controls to supply electric power to the transmission circuit after a predetermined time is elapsed from the start of the electric power supply to the drive unit.

The arrangement will enable the radar antenna device to produce the expected effects of the present invention with a simple construction, since there are not required to be used a rotary encoder, a current detection unit and the like.

Another feature of the present invention is to provide the radar antenna device having the transmission start signal producer for producing a transmission start signal which comprises a transmission initiation timing reception unit to produce a transmission start signal to be supplied to the controller.

With this arrangement, it will be possible to start supplying the electric power for the signal transmission to emit a transmission signal at a time instant a user wants after the antenna unit was started to move.

Another feature of the present invention is to provide a method for controlling the radar antenna device which comprises generating transmission signal by the transmission circuit, producing a transmission start signal, generating a driving force to supply electric power for the drive from an electric power source so that a driving force is generated to rotate the antenna unit, controlling transmission circuit when the transmission start signal is received, so that the electric power for the transmission will be supplied to the transmission circuit after the electric power for the drive is supplied to the drive unit.

This configuration enables the capacity of the electric power source to be reduced, since electric power for emitting transmission signals are not used in an initial time period to drive the antenna in which the maximum electric power is necessary to be supplied. Thus, it will be possible to manufacture the radar antenna device at a lower cost and to reduce the size and weight thereof.

Another feature of the present invention is to provide a method for controlling the radar antenna device having the transmission start signal producing which comprises detecting a state value of the antenna unit which varies in a rotational movement thereof starting from the standstill, and judging whether the state value detected at the detecting satisfies the predetermined value to produce the transmission start signal.

The arrangement enables to start supplying electric power for the signal transmission to the transmission circuit at an appropriate and predetermined timing, when an appropriate condition has been set for the state value.

According to one aspect of the present invention, there is provided a radar antenna device for rotating an antenna emitting successively transmission signals into an outer space and receiving echo signals reflected by objects which comprises an electric power source, a motor for rotating the antenna when electric power is supplied from the electric power source, a transmitter for generating transmission signals to be fed to the antenna when electric power is supplied from the electric power source, and a controller for controlling the radar antenna device so that the transmitter generates transmission signals, within half a rotation of the antenna after the electric power is supplied to the motor to rotate the antenna.

According to one aspect of the present invention, there is provided a radar antenna device for rotating an antenna emitting successively transmission signals into an outer space and receiving echo signals reflected by objects which comprises an electric power source, a motor for rotating the antenna using electric power supplied from the electric power source, a transmitter for generating transmission signals to be fed to the antenna using electric power supplied from the electric power source, and a controller for controlling to generate a transmission signal after a time instant at which the peak motor current flows in a first rotational movement of the antenna started from the standstill.

According to one aspect of the present invention, there is provided a radar antenna device for rotating an antenna emitting successively transmission signals into an outer space and receiving echoes reflected by objects which comprises an electric power source, a drive unit for producing a driving force to rotate the antenna using electric power supplied from the electric power source, a transmitter for generating transmission signals using electric power supplied from the electric power source, and a controller for controlling the transmitter to generate transmission signals after a time elapsed, with the time corresponding to a time period from the start of antenna movement to the first peak electric power supplied to the drive unit.

According to one aspect of the present invention, there is provided a method for controlling the electric power source of the radar antenna device rotating an antenna and successively emitting transmission signals in mutually different directions and receiving echo signals reflected by objects which comprises a step for producing a transmission start signal, a step for rotating the antenna using electric power supplied from an electric power source, and a step for generating transmission signals using electric power supplied from the electric power source, in response to the transmission start signal, with the transmission signals supplied to the antenna.

BRIEF DESCRIPTION OF THE DRAWINGS

Referring now to the attached drawings which form a part of this original disclosure.

DETAILED DESCRIPTION OF EMBODIMENTS

Figure 1:
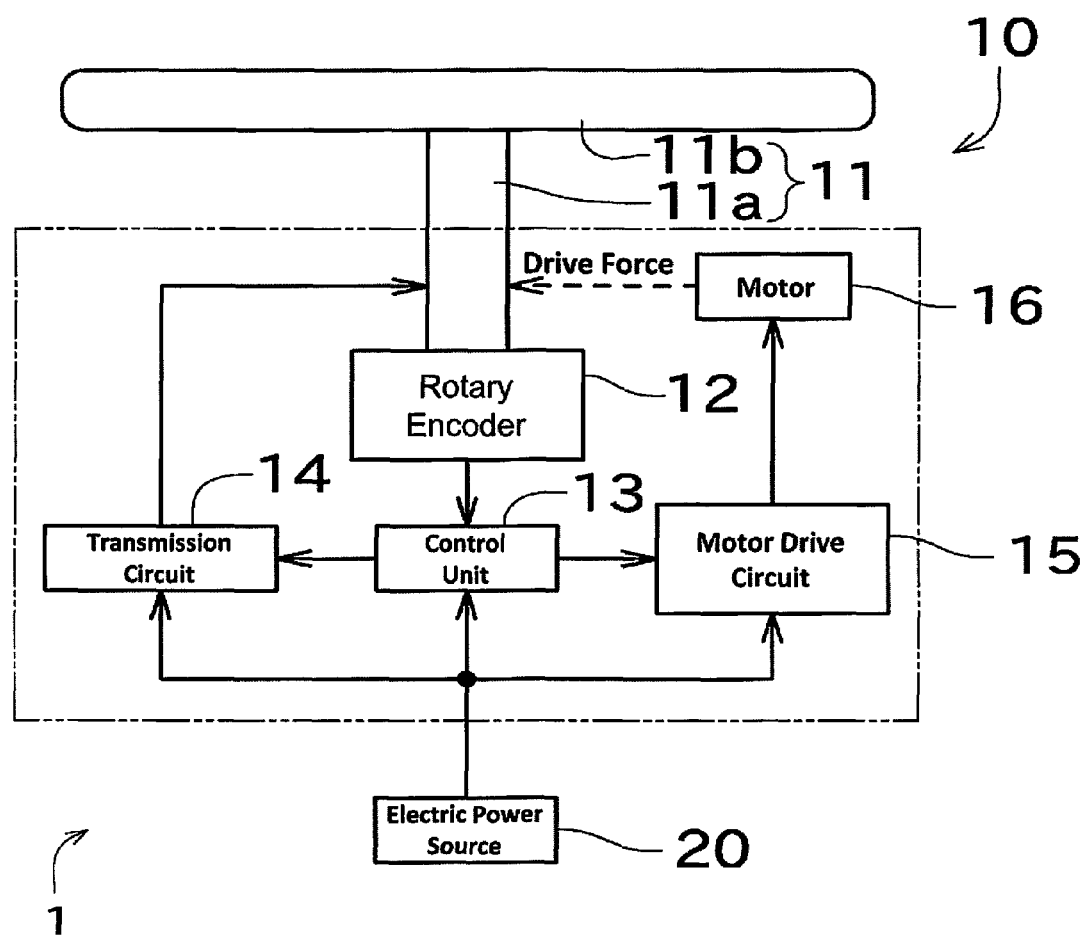
FIG. 1 shows a block diagram illustrating the arrangement of a radar antenna device according to a first embodiment of the present invention.

Referring to the drawings, preferred embodiments of the present invention will be explained. At first, referring to FIG. 1, a radar antenna device 1 will be explained. FIG. 1 shows a block diagram illustrating the construction of a radar antenna device according to a first embodiment of the present invention.

The radar antenna device 1 is installed in a ship. A marine radar apparatus is comprised with the radar antenna device 1, an indicator and other units which are not shown. The radar antenna device 1 emits a transmission signal as radio waves from an antenna unit 11 and receives echo signals resulting from the transmission signal. A signal processing unit disposed in the radar antenna device 1 or in the indicator analyzes received echo signals so that there will be calculated the distance between the own ship and a target and the bearing thereof with respect to the ship. The signal processing unit generates radar images based on the calculated information. The radar images will be displayed on the indicator.

Hereinafter, the radar antenna device 1 will be explained in detail. As shown in FIG. 1, the radar antenna device 1 is comprised with a main antenna part 10 and an electric power source 20. The main antenna part 10 is comprised with main parts constituting the radar antenna. The electric power source 20 supplies the main antenna part 10 with electric power.

As shown in FIG. 1, the main antenna part 10 is comprised with an antenna unit 11, a rotary encoder 12, a control unit 13, a transmission circuit 14, a motor drive circuit 15 and a motor 16 as a drive unit.

The antenna unit 11 is comprised with a rotation shaft 11a and a main antenna part 11b. The rotation shaft 11a is formed in a cylindrical shape and rotatably disposed. In the rotation shaft 11a, a waveguide is formed so that transmission signals are propagated therethrough and emitted into the outer space. There is fixed on the rotation shaft 11a the main antenna part 11b in a rectangular shape having a long width.

The main antenna part 11b radiates transmission signals passed through the waveguide in the rotation shaft 11a into the outer space and receives echo signals reflected by objects. The echo signals are received by the main antenna part 11b, and pass through the waveguide in the same way as the transmission signal emitted. Then the echo signals are amplified and supplied to a signal processing unit.

The rotary encoder 12 is fixed on the rotation shaft 11a and detects the rotational angle of the rotation shaft 11a and the antenna unit 11. More specifically, the rotary encoder 12 produces a pulse signal each time the rotation shaft 11a is rotated by a predetermined azimuthal angle. Generated pulse signals are counted to detect an azimuthal angle range in which the antenna unit 11 is rotated. The detected angle output is supplied to the control unit 13.

The transmission circuit 14 generates a transmission signal to be emitted by the antenna unit 11 into the outer space, when or after electric power is supplied thereto. The transmission circuit 14 is comprised with a signal generator for generating a base signal, a local oscillator for generating a local oscillation signal and a mixer for mixing the base signal with the oscillation signal to produce a transmission signal. The transmission circuit 14 supplies the resultant transmission signal to the antenna unit 11.

A motor 16 generates a driving force, when electric power is supplied thereto. The driving force generated by the motor 16 is used to rotate the rotation shaft 11a and thus the antenna unit 11. It is to be noted that the larger electric current flows in the motor 16, the larger the resultant driving force will be.

The motor drive circuit 15 drives and controls the motor 16. The motor drive circuit 15 is, for instance, capable of regulating a voltage fed to the motor 16 so that the motor 16 will rotate at a constant speed.

The control unit 13 is comprised with a central processing unit and functions to control the units in the radar antenna device. For instance, the control unit 13 controls to instruct the transmission circuit 14 to generate and emit transmission signals. The control unit 13 determines the rotational speed of the antenna unit 11 based on input values fed from the rotary encoder 12 and supplies the resultant speed to the motor drive circuit 15.

An electric power source 20 supplies electric power to the control unit 13, the transmission circuit 14, the motor drive circuit 15 and the motor 16 connected thereto. The control unit 13 controls the transmission circuit 14 or the electric power source 20 so that there will be regulated the electric power supplied to the transmission circuit 14. The control unit 13 also controls the motor drive circuit 15 or the electric power source 20 so that there will be regulated the electric power supplied to the motor drive circuit 15. It is to be noted that the capacity of the electric power source 20 is made smaller as compared to conventional ones.

Figure 2A:
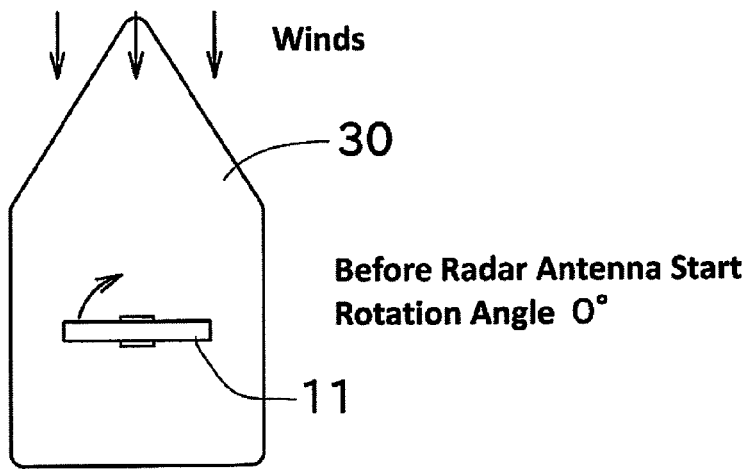
FIG. 2A, FIG. 2B and FIG. 2C show schematically variations of the rotational angle of the antenna unit.
Figure 2B:
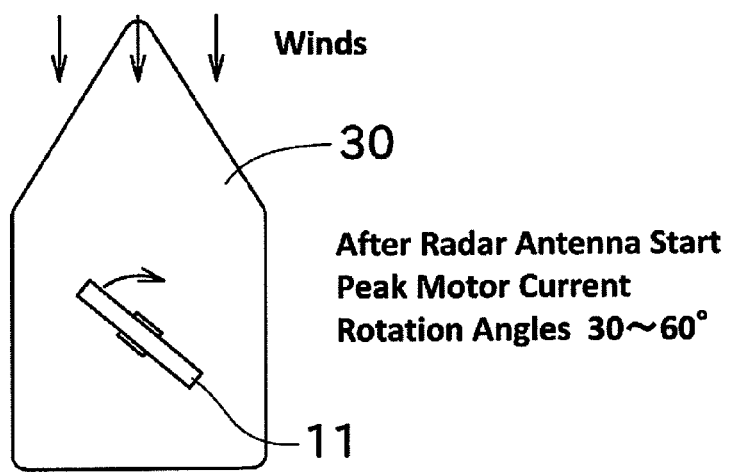
Figure 2C:
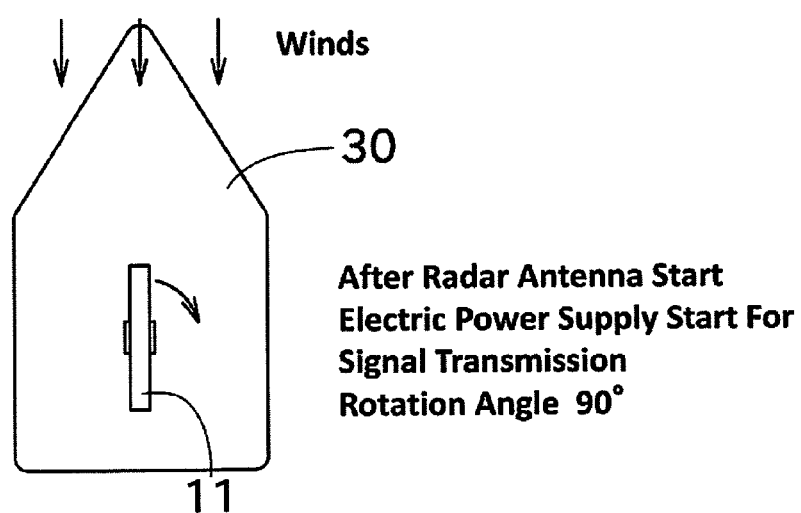

Next, there will be explained the operations performed by the radar antenna device 1 when it is started in order to decrease the capacity of the electric power source 20. FIG. 2A, FIG. 2B and FIG. 2C show schematically variations of the rotational angle of the antenna unit of the radar antenna device 1.

While transmission signals are emitted and received by the antenna unit 11, it rotates horizontally. For instance, when the own ship calls a port and the radar antenna device 1 is not used, the radar antenna device ceases to emit radio waves and stops rotating the antenna unit 11.

As shown in FIG. 2A, when the winds blow from the front of the ship, in general, the antenna unit 11 stops as with the wind direction being perpendicular to the longitudinal direction of the antenna main part 11b. In the case shown in FIG. 2A, the situation is resulted by a balance between a clockwise rotational force given by the wind and an anticlockwise rotational force given thereby. It is to be noted that there are cases in which the main antenna part 10 is ceased to rotate as the wind blow direction is in parallel with the longitudinal direction of the main antenna part 11b as shown in FIG. 2C.

Next, there will be explained the way to start the radar antenna device 1 which has been maintained as shown in FIG. 2A. In general, a large drive force corresponding to much electric power is required to overcome a static friction force in order to start the antenna unit 11 which has been resting and to accelerate the unit 11 which has been in standstill state.

A force required for rotating the antenna unit 11 depends on the attitude of the antenna unit 11. More specifically, when the longitudinal direction of the main antenna part 11b is displaced by 30 to 60 degrees with respect to the wind direction as shown in FIG. 2B, a larger drive force corresponding to high electric power will be required to overcome wind pressure effects. When the antenna is then rotated and directed as shown in FIG. 2C, electric power required to drive the antenna unit 11 will be decreased.

Figure 3:
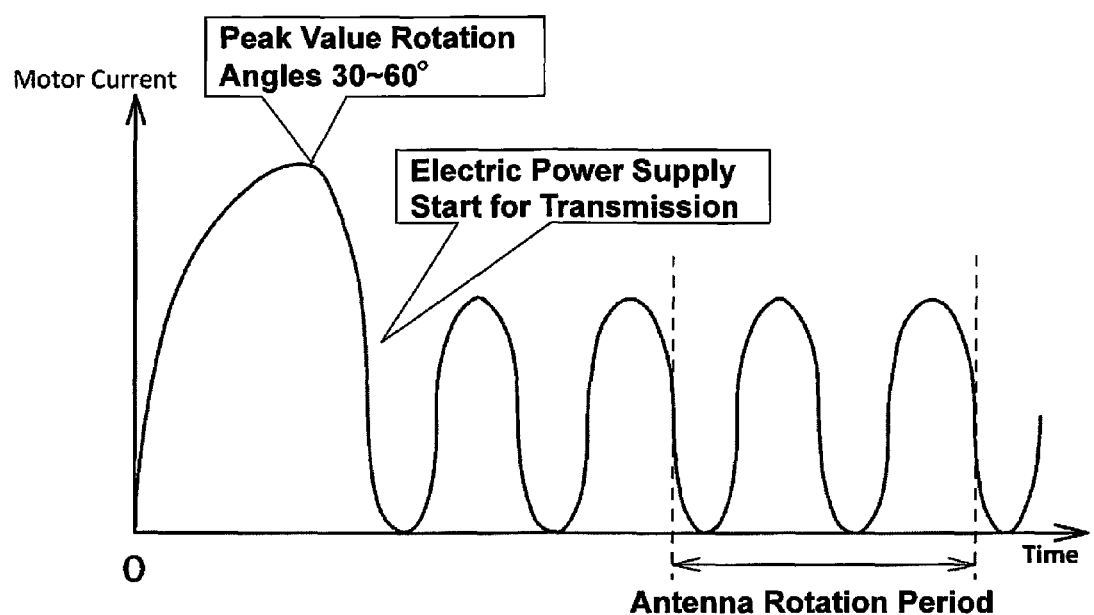
FIG. 3 shows graphically variations of the motor current in the radar antenna device.

Referring to FIG. 3, there will be explained about a drive force corresponding to electric power required to start the radar antenna device 1. FIG. 3 shows a graph illustrating variations of the motor current of the radar antenna device 1. In FIG. 3, the horizontal axis thereof represents time, and the vertical axis represents motor current.

The motor current increases drastically up to the peak value from the drive start time corresponding to a time "0". At the peak current value, there will be big effects due to an increase of the motor current caused by the start drive of the antenna unit 11 and due to increases of the motor current corresponding to the rotational angles of the antenna unit 11. Thus, the rotational angles of the antenna unit 11 corresponding to the peak value are 30 to 60 degrees as shown in FIG. 2B.

After the peak value, the motor current will be decreased. When the rotational angle of the antenna unit 11 comes to 90 degrees as shown in FIG. 2C, the motor current will be decreased with respect to the peak value and thus will be small, since some time has passed after the time corresponding to the peak value.

With the following antenna rotations, the motor current varies between ups and downs at a constant time period. It is to be noted that the motor current takes maximum values twice during one rotation of the antenna unit 11, since the attitude of the antenna unit 11 as shown in FIG. 2B is brought about during the one rotation. The front of the antenna unit 11 is directed in an upper right direction and in a lower left direction during the one rotation. It is to be noted that the following maximum values of the motor current will be smaller with respect to the first maximum value which is the peak value.

The electric power source 20 is required to have the capacity to cope with the first peak motor current value which is the largest among maximum current values. Further, the electric power source is required to generate electric power to be supplied to the control unit 13 and the transmission circuit 14.

A conventional radar antenna device was arranged to emit a transmission signal immediately after the antenna device was started to be driven. Thus, electric power for the signal transmission was supplied to the transmission circuit soon after the radar antenna device was started. Thus, there was required an electric power source having a capacity which is capable of supplying at the same time the electric power consumed by the control unit, the electric power for emitting transmission signals, and the electric power corresponding to the peak value of the motor current. Consequently, it was necessary to use a conventional electric power source having a larger capacity. Particularly, there was used by radar apparatuses a transmission signal having a high voltage, which required an electric power source having an extremely large capacity.

Figure 4:
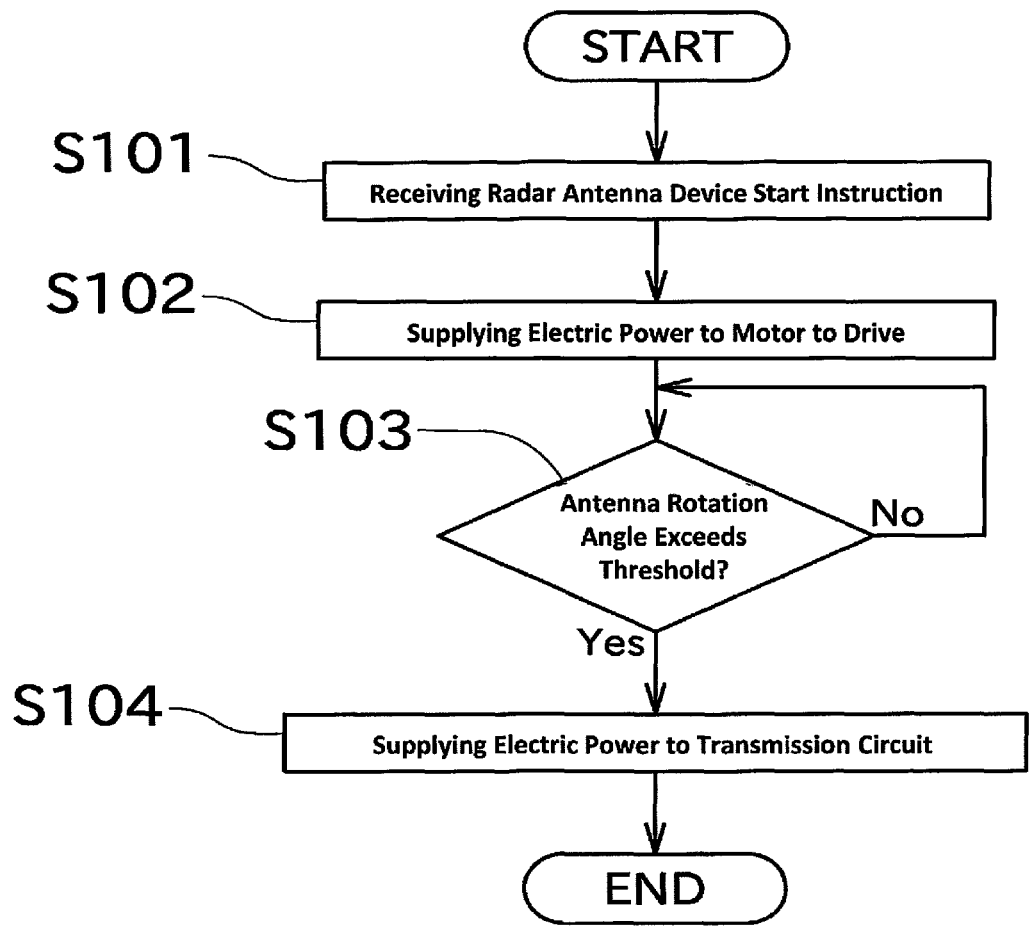
FIG. 4 shows a flow chart representing electric power source control performed by the radar antenna device when a start command is received to operate the radar antenna device.

The radar antenna device 1 according to an embodiment of the present invention is configured not to supply electric power for the signal transmission to the transmission circuit 14 immediately after the radar antenna device 1 is started. The electric power for the signal transmission is supplied to the transmission circuit 14 after the motor current reached the peak value. Thus, when the electric power to drive the motor is at the peak value or are larger values, electric power for the transmissions are not supplied from the electric power source 20 so that the capacity of the electric power source 20 can be reduced to be small. This relationship will be explained in more detail, referring to the flow chart in FIG. 4. FIG. 4 shows a flow chart illustrating the power source control performed by the radar antenna device 1 when an instruction is received thereby to start the radar antenna device 1.

At a step S101, the radar antenna device 1 receives an instruction from a user to start emitting transmission signals or to start the device to be driven. At a step S102, in response to the instruction, the radar antenna device 1 supplies electric power to the control unit 13 and to the other units so that controls are made to start executing relevant programs in softwares to operate and to supply electric power to the motor 16 to be driven through the motor drive circuit 15. It is to be noted that the radar antenna device 1 is controlled at this stage not to supply to the transmission circuit 14 electric power for emitting transmission signals.

At a step S103, the control unit 13 of the radar antenna device 1 judges whether a rotational angle of the antenna unit 11 exceeds a predetermined threshold based on the rotational angle fed from the rotary encoder 12. More specifically, the control unit 13 receives a pulse signal produced by the rotary encoder 12 every time the antenna unit 11 is rotated by a predetermined angle range. The control unit 13 judges the threshold as exceeded when the number of pulse signals produced by the rotary encoder 12 becomes more than the predetermined one.

In order to decrease the capacity of the electric power source 20, it is preferable that a threshold angle is set as the one corresponding to a time after the peak motor current is produced, which is in about an angle range 30 to 60 degrees shown in FIG. 2B. It is also preferable that the threshold angle should not be too big, should be up to about 90 degrees, in order to emit a transmission signal to display a radar image on an indicator at an earlier time.

At a step S104, the control unit 13 of the radar antenna device 1 starts to supply electric power to the transmission circuit when it is judged that the rotational angle of the main radar antenna part 10 exceeds the threshold angle. Then, the control unit 13 of the radar antenna device 1 resumes normal controlling jobs.

As aforementioned, the radar antenna device 1 is comprised with the electric power source 20, the motor 16, the transmission circuit 14, the antenna unit 11, the rotary encoder 12 and the control unit 13. The motor 16 produces a driving force when electric power is supplied thereto from the electric power source 20. The transmission circuit 14 generates transmission signals when electric power is supplied thereto from the electric power source 20. The antenna unit 11 is rotated by the driving force generated by the motor 16 and emits successively transmission signals generated by the transmission circuit 14 into an outer space. The rotary encoder 12 detects varying angles of the antenna unit corresponding to a series of successive rotational movements of the antenna with respect to the standstill state. The control unit 13 controls the radar antenna device after electric power supply is initiated to the motor 16 so that electric power is supplied to the transmission circuit 14 to which electric power has not been supplied from the electric power source 20. The electric power is initiated to be supplied to the transmission circuit 14 after the antenna unit 11 starts to rotate from the standstill state, more in detail, after a rotational angle detected by the rotary encoder 12 satisfies a predetermined condition.

With this configuration, the electric power source 20 does not supply electric power for emitting transmission signals until the motor current increases up to the peak value and exceeds the threshold level. Since the electric power supply for the transmission is not made when the electric power for the drive are substantially the maximum one, the electric power source is not required to simultaneously supply possible maximum electric power for driving the motor and for emitting a transmission signal. The configuration will reduce the capacity of the electric power source. The electric power intended to be used for the transmission of signals can be utilized for driving the motor. It is to be noted that electric power required for the transmission of signals becomes large, since the voltage of the transmission signal is high. Thus, with the configuration of the radar antenna device employed, the capacity required of the electric power source 20 will be greatly reduced. It will be possible to manufacture the radar antenna device at a lower cost and to reduce the size and weight thereof.

Figure 5:
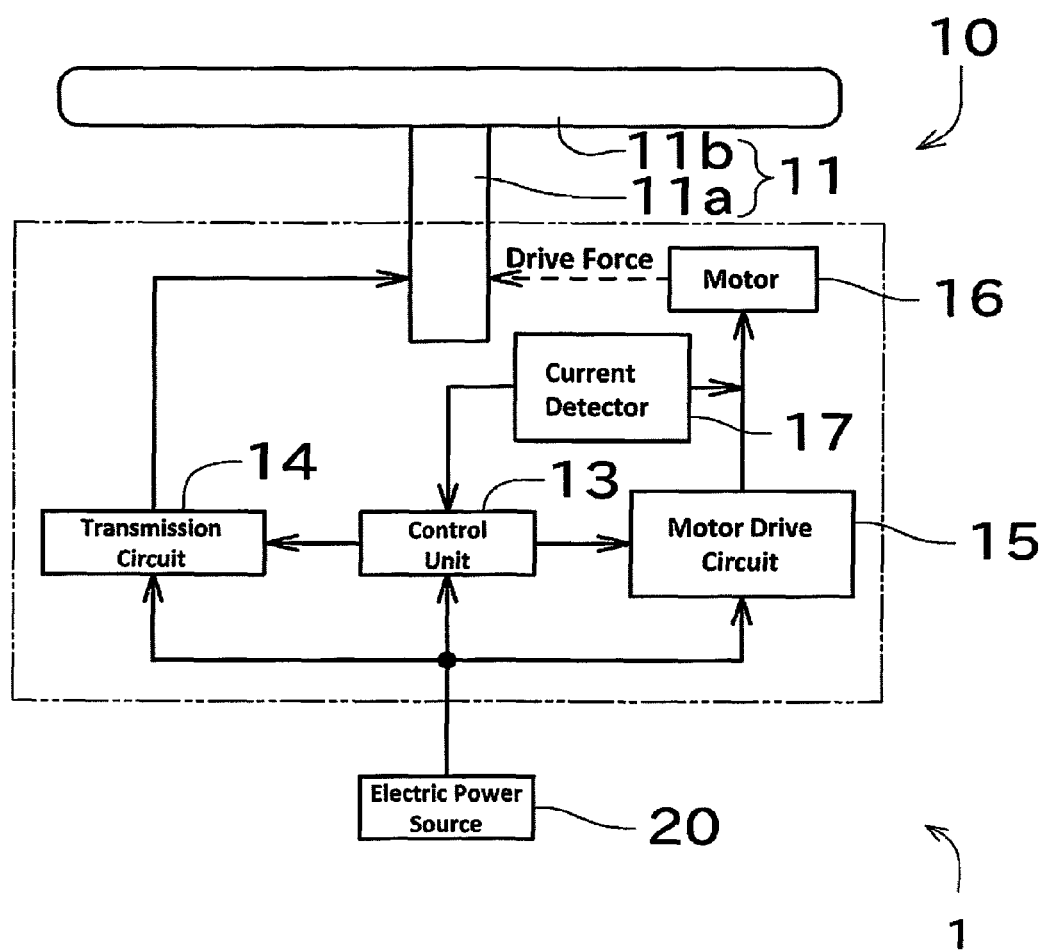
FIG. 5 shows the arrangement of a radar antenna device in a block diagram form, according to another second embodiment of the present invention.

Next, a second embodiment of the present invention will be explained. FIG. 5 shows a block diagram illustrating the arrangement of the radar antenna device 1 according to a second embodiment of the present invention. It is to be noted that like numerals are given to like units in the second and the following third embodiments as the units used in the first embodiment of the invention, and some explanations about the units will not be made.

With the first embodiment of the radar antenna device according to the invention, the rotary encoder detects rotational angles of the antenna unit 11. Other means can be employed than using the rotational angle of the antenna unit, with the means using state values corresponding to rotational movements of the antenna unit 11 started to rotate from the standstill state.

With the second embodiment of the radar antenna device according to the invention, a current detector is used to detect motor current supplied to the motor 16 as the state value. There is made a judgment based on the motor current corresponding to the one at the step S103 as explained above so that electric power will be supplied to the transmission circuit 14 after the time instant at which the peak value of the motor current is surely passed.

It is to be noted that when the motor current is used as a state value, it is also possible to set a condition in considering not only the value of the motor current but also the varying motor current to detect that the motor current reaches the peak value. For instance, a first maximum value obtained after the radar antenna device 1 is started to be driven, is considered in general to be the peak value of the motor current. Consequently, there can be used as one of the conditions a time instant following the shift from the increase of the motor current to the decrease thereof.

It is to be noted that there can be used other appropriate state values than the rotational angle of the antenna unit 11 or the motor current. It is also possible to use other methods, for instance, as measuring a time. The control unit 13 controls in such a way that electric power is supplied to the transmission circuit in a few seconds after the antenna unit 11 is started to be driven.

Figure 6:
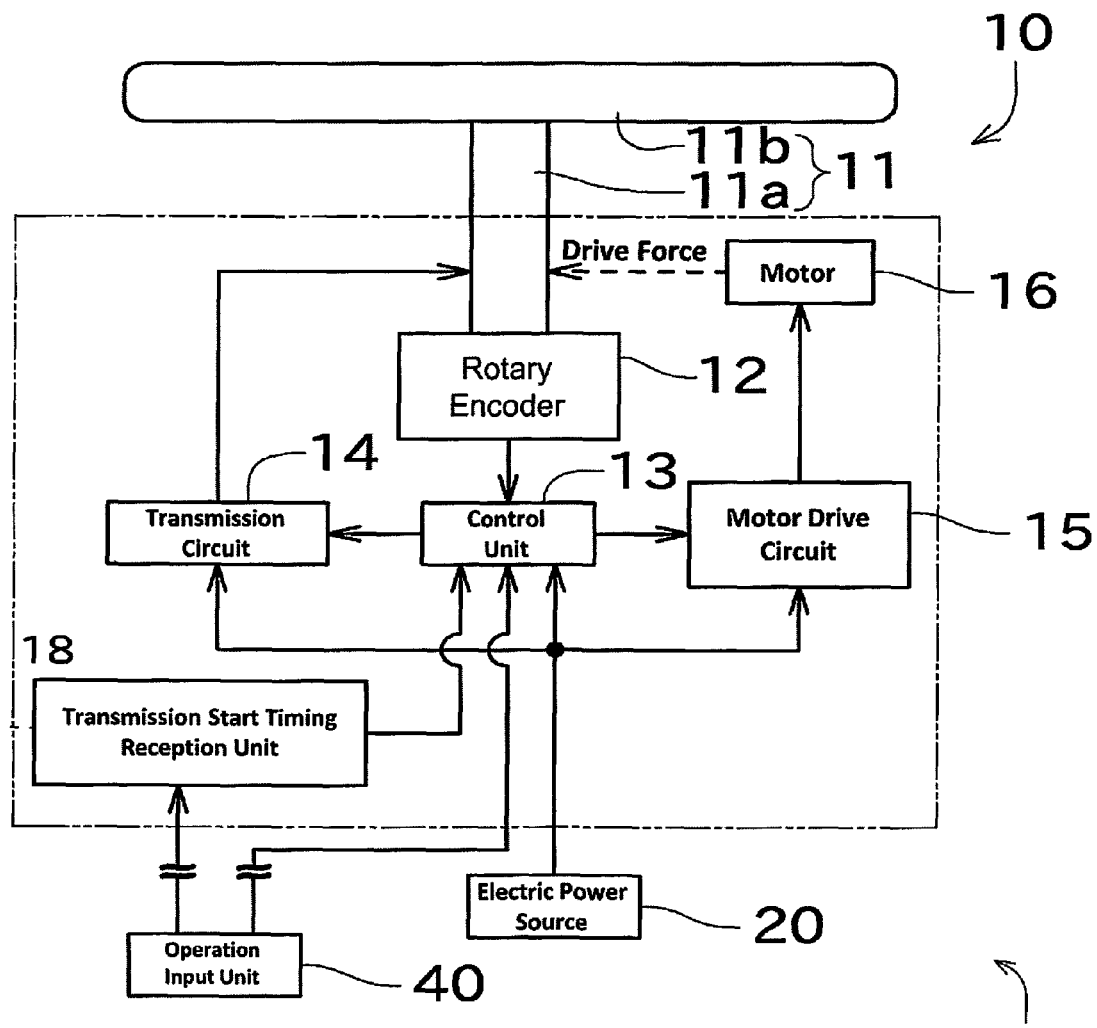
FIG. 6 shows the arrangement of a radar antenna device in a block diagram form, according to a third embodiment of the present invention.

Next, a third embodiment of the radar antenna device according to the invention will be explained. FIG. 6 shows a block diagram illustrating the arrangement of the radar antenna device 1 according to a third embodiment of the present invention.

With the first and second embodiments of the invention, the radar antenna device 1 uses the rotational angle of the antenna and the motor current as the state value respectively. The two embodiments of the invention are arranged in such ways that electric power supplies for the signal transmission are initiated when the state values meet predetermined conditions respectively. While, with the radar antenna device 1 according to the third embodiment of the invention, the electric power supply for the transmission is started when an instruction is given by a user.

At first a user provides the radar antenna device 1 with an instruction to start the electric power supply for the transmission, in a similar way as with the embodiments as explained above. The instruction to start the electric power supply is made by using an operation input unit 40 which is comprised with keys, a track ball and a touch panel.

Then, as in a similar way as with the first and second embodiments of the invention, at first the electric current for the drive is supplied so that the antenna unit 11 starts to be rotated. The user performs at a time instant a predetermined operation on the operation input unit 40 to provide an instruction to start emitting transmission signals. The instruction is received by a transmission initiation timing reception unit 18, and then is transferred to the control unit 13. When the control unit 13 receives the instruction, electric power supply for the transmission will be started.

The radar antenna device 1 starts to supply the electric power for the transmission when the instruction is received. It is to be noted that with the third embodiment of the radar antenna device 1, the control unit 13 and the transmission initiation timing reception unit 18 are arranged separately in different parts respectively, it is also possible to have the function of the transmission initiation timing reception unit 18 in the control unit 13.

There have been explained the preferred embodiments of the invention. The arrangements described above can be modified as in the following.

In the foregoing, the radar antenna device is arranged such that when a state value meets the predetermined value, the electric power will be supplied to the transmission circuit. Alternately, it is also possible to have such an arrangement that standby electric power which is smaller than the electric power for emitting transmission signals is supplied to the transmission circuit immediately after the radar antenna device 1 is started to operate. Then, when a state value meets the predetermined condition, the standby electric power will be increased drastically to the sufficient electric power to emit the transmission signals.

In the foregoing, an explanation is made in a case that the antenna unit 11 is stopped to move as shown in FIG. 2A. It is also possible for the radar antenna device to work in the same way and to produce expected effects even if the antenna unit 11 is started to rotate from an angle different from the one shown in the Figure.

The use of the present invention is not limited to marine radar apparatuses. It is also applicable to radar antenna devices installed on other moving bodies such as airplanes. The present invention is applicable and can be used not only for semiconductor-type radar apparatuses but also for magnetron-type radar apparatuses. With the magnetron-type radar apparatuses, an electric power source is provided for heating the magnetron. But, this electric power source is provided separately and independently of the electric power source for the signal transmission and the motor drive. Thus, the same control method can be used for the magnetron-type. It is to be noted that, in general, the control is conducted after a pre-heating of the magnetron is completed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims.

What is claimed is:

1. A radar antenna device comprising:
   an electric power source;
   a drive unit configured to produce a driving force when electric power is supplied from the electric power source;
   a transmission circuit configured to generate a transmission signal when electric power is supplied from the electric power source;
   an antenna configured to emits the transmission signal into an outer space while being rotated by the driving force produced by the drive unit;
   a transmission start signal producer configured to produce a transmission start signal; and
   a controller configured to control the transmission circuit in response to the transmission start signal from the transmission start signal producer so that the electric power for the transmission will be supplied to the transmission circuit after the electric power is supplied to the drive unit.

2. The radar antenna device of claim 1 wherein the transmission start signal producer comprises a detector which detects a state value varying when the antenna is rotated from a standstill and produces the transmission start signal when a detected state value meets the predetermined condition.

3. The radar antenna device of claim 2 wherein the detector detects as the state value a rotation angle resulted from a rotational movement of the antenna started from the standstill.

4. The radar antenna device of claim 3 wherein the controller judges that the predetermined condition is met when the rotation angle exceeds the threshold which is larger than a rotation angle corresponding to a peak current of the drive unit in a rotational movement of the antenna unit starting to rotate from the standstill.

5. The radar antenna device of claim 4 wherein the rotation angle threshold is from 60 to 90 degrees.

6. The radar antenna device of claim 2 wherein the detector detects an electric current flowing the drive unit as the state value.

7. The radar antenna device of claim 1 wherein the controller controls to supply electric power to the transmission circuit after a predetermined time is elapsed from the start of the electric power supply to the drive unit.

8. The radar antenna device of claim 1 wherein the transmission start signal producer configured to produce a transmission start signal comprises a transmission initiation timing reception unit to produce a transmission start signal to be supplied to the controller.

9. The radar antenna device of claim 1 wherein the controller controls the transmission circuit to generate a transmission signal after a time instant at which a peak motor current flows in a first rotational movement of the antenna started from a standstill.

10. The radar antenna device of claim 1 wherein the controller controls the transmission circuit to generate transmission signals after a time elapsed, with the time corresponding to a time period from the start of antenna movement to the first peak electric power supplied to the drive unit.

11. A method for controlling a radar antenna device comprising:
    generating transmission signal by a transmission circuit;
    producing a transmission start signal;
    generating a driving force to supply electric power for the drive from an electric power source so that a driving force is generated to rotate an antenna unit of the radar antenna device;
    controlling the transmission circuit when the transmission start signal is received, so that the electric power for the transmission will be supplied to the transmission circuit after the electric power for the drive is supplied to the drive unit.

12. The method for controlling the radar antenna device of the claim 11 wherein the transmission start signal producing comprises detecting a state value of the antenna unit which varies in a rotational movement thereof starting from a standstill, and judging whether a state value detected at the detecting satisfies the predetermined value to produce the transmission start signal.

13. The method for controlling the radar antenna device of the claim 11 further comprising controlling the transmission circuit to generate a transmission signal after a time instant at which a peak motor current flows in a first rotational movement of the antenna started from a standstill.

14. The method for controlling the radar antenna device of the claim 11 further comprising controlling the transmission circuit to generate transmission signals after a time elapsed, with the time corresponding to a time period from the start of antenna movement to the first peak electric power supplied to the drive unit.

* * * * *